(12) United States Patent
Fisk et al.

(10) Patent No.: US 7,677,587 B2
(45) Date of Patent: Mar. 16, 2010

(54) TRAILER AND HITCH MECHANISM FOR A ROBOT

(75) Inventors: Allan T. Fisk, Needham, MA (US); Michael L. Robert, Uxbridge, MA (US); Michael T. Johnson, Southborough, MA (US); Charles Edwin Dean, Shrewsbury, MA (US)

(73) Assignee: Foster-Miller, Inc., Waltham, MA (US)

( * ) Notice: Subject to any disclaimer, the term of this patent is extended or adjusted under 35 U.S.C. 154(b) by 508 days.

(21) Appl. No.: 11/654,196

(22) Filed: Jan. 17, 2007

(65) Prior Publication Data

US 2010/0025964 A1   Feb. 4, 2010

(51) Int. Cl.
*B62D 13/00* (2006.01)
(52) U.S. Cl. .................. 280/443; 280/445; 280/5.24
(58) Field of Classification Search ................. 280/443, 280/444, 445, 426, 508, 460.1, 5.24
See application file for complete search history.

(56) References Cited

U.S. PATENT DOCUMENTS

| | | | | |
|---|---|---|---|---|
| 3,746,369 A | * | 7/1973 | Neff et al. ................ | 280/476.1 |
| 4,889,212 A | * | 12/1989 | Temple .................... | 188/112 R |
| 5,280,939 A | * | 1/1994 | Kee et al. ................. | 280/432 |
| 5,280,940 A | * | 1/1994 | Kendall ................... | 280/492 |
| 6,273,446 B1 | * | 8/2001 | Paul ........................ | 280/448 |
| 6,523,629 B1 | * | 2/2003 | Buttz et al. .............. | 180/167 |
| 6,935,818 B2 | * | 8/2005 | Hoeper et al. ............ | 410/18 |
| 7,434,826 B1 | * | 10/2008 | Lambros .................. | 280/508 |
| 7,484,749 B1 | * | 2/2009 | Doyle et al. ............. | 280/460.1 |
| 2002/0180178 A1 | * | 12/2002 | Masters et al. .......... | 280/426 |

* cited by examiner

*Primary Examiner*—Lesley Morris
*Assistant Examiner*—Tashiana Adams
(74) *Attorney, Agent, or Firm*—Iandiorio Teska & Coleman (57) ABSTRACT

A trailer and hitch system for a mobile robot. The trailer includes a front Ackerman steering linkage, a releasable locking mechanism for releasably positioning the Ackerman steering linkage in a turned position to arrest the trailer, a tow bar extending upwardly from the Ackerman steering linkage and terminating in a lunette ring, and spaced skid members extending downwardly and rearwardly. The mobile robot includes a hitch assembly for the lunette ring. The hitch assembly has a frame including a slot for the lunette ring and a guide portion for guiding the lunette ring into the slot, a latch pivotable with respect to the frame and biased to close the slot, and a decoupling mechanism configured to move the latch to release the lunette ring from the slot. A robot arm is maneuverable to engage the decoupling mechanism.

21 Claims, 13 Drawing Sheets

TRAILER AND HITCH MECHANISM FOR A ROBOT

FIELD OF THE INVENTION

This subject invention relates to robotics, typically mobile remote controlled robots.

BACKGROUND OF THE INVENTION

Mobile, remotely controlled robots such as the TALON robot (Foster-Miller, Inc., Waltham, Mass.) are often used in a wide variety of circumstances and environments. On the battlefield or otherwise, small, maneuverable, lightweight, remote control robots can be used to minimize human exposure to potentially lethal environments and situations. The Foster-Miller Talon™ robot has been widely used to detect and disable explosive devices and ordnances in the field including roadside bombs in Iraq. One advantage of using a remotely controlled robot is that it eliminates the need for personnel to approach the explosive device. The individuals controlling the robot may remain at a relatively safe distance, usually a few hundred meters from the explosive device.

Disabling the explosive most often requires that the robot perform multiple operations, including digging to expose the device, gripping to move the device or to remove any covering over the device, and/or cutting to sever control wires and disable the device.

Robots employed to detect and disable explosive devices typically have an arm with an end effecter or tool which is capable of accomplishing these operations.

There are also instances where items, equipment, and even personnel need to be transported by the robot. Commercially available trailers are not well suited for this task. Such trailers are not equipped to couple to and disengage from the towing vehicle automatically. Therefore, the trailer, once coupled to a robot, and maneuvered by the robot to a location some distance from the operator, can not be decoupled from the robot without human interaction. There are situations where, for example, the robot's mission is to tow a trailer to one location, decouple from the trailer, and maneuver about that location and/or maneuver to another location and then later recouple to the trailer and return to the operator. It would also be useful to tow a trailer loaded with a munition, for example, to a target, decouple the robot from the robot, and then maneuver the robot to a safe location before detonating the munition.

Currently available trailers also have no brake mechanism to arrest the trailer, for example, on sloping terrain once it is decoupled from the robot. Also, commercially available trailers are not generally configured to traverse obstacles.

U.S. Pat. No. 6,523,629 incorporated herein by this reference, discloses a hitch mechanism for tandem robots but does not suggest a trailer coupled to a robot. Also, the hitch mechanism is fairly complex and requires many active (i.e. driven) components adding to the complexity of the robot.

SUMMARY OF THE INVENTION

It is therefore an object of this invention to provide a trailer and hitch system for a mobile robot which allows the robot to tow a trailer to a location, decouple from the trailer and maneuver about that location and/or maneuver to a different location and then later recouple to the trailer and return.

It is a further object of this invention to provide such a system which allows the trailer to be arrested on sloping terrain and while the robot couples to and decouples from the trailer.

It is a further object of this invention to provide such a system wherein the trailer is better able to traverse obstacles.

The subject invention results from the realization that a more durable, simple in design, and less expensive mobile robot and trailer combination is effected by a hitch assembly on the mobile robot which couples to the trailer tow bar by driving the tow bar into a receiver of the hitch assembly and which uncouples the trailer from the mobile robot by an action taken by the robot itself. Furthermore, the trailer includes both a self-actuating braking mechanism and is also configured to better traverse obstacles.

It is a further object of this invention to provide a robot-mounted remotely operable hitch system that can be used with other types of trailers, notably disposable trailers and potentially "home-made" trailers and skids that are adapted by the user for connection to the hitch.

The subject invention, however, in other embodiments, need not achieve all these objectives and the claims hereof should not be limited to structures or methods capable of achieving these objectives.

This invention features a trailer and hitch system for a mobile robot. The trailer typically includes a front Ackerman steering linkage, a releasable locking mechanism for releasably positioning the Ackerman steering linkage in a turned position to arrest the trailer, a tow bar extending upwardly from the Ackerman steering linkage and terminating in a lunette ring, and spaced skid members extending downwardly and rearwardly. A mobile robot typically includes a hitch assembly for the lunette ring. The preferred hitch assembly has a frame including a slot for the lunette ring and a guide portion for guiding the lunette ring into the slot. A latch is pivotable with respect to the frame and biased to close the slot. A decoupling mechanism is configured to move the latch to release the lunette ring from the slot. The mobile robot also includes an arm maneuverable to engage the decoupling mechanism, and typically cameras and lights to assist the remote operator.

The preferred trailer includes removable and foldable side walls. The Ackerman steering linkage may include a downwardly depending drive post. The tow bar is then connected to the drive post. One locking mechanism includes a drive plate with spaced spring ball mechanisms thereon receivable in detents in a frame member of the trailer. The preferred tow bar includes a tubular member and the lunette ring is receivable in the end of the tubular member. In one example the lunette ring is attached to a shaft extending through a frame member received in the end of the tubular member. The shaft is rotatably affixed to the frame member. Typically, the lunette ring has a diameter of between 3 and 8 inches for easier coupling to the hitch assembly.

The hitch assembly frame may include spaced plates and the latch is positioned between the spaced plates. In one design, each plate includes an upwardly extending ear and an angled downwardly depending ear guide portion. The slot is located between the upwardly extending ear and the angled downwardly depending ear. The preferred latch includes an exposed hook and a rocker portion between the plates. The rocker portion may include a distal edge, a top edge, and a bottom edge. A pin through the distal edge proximate the bottom edge pivotably connects the rocker portion to the plates. The decoupling mechanism then includes a post extending from the rocker portion distal edge proximate the top edge. A tension spring extends from the rocker portion top edge. The mobile robot arm includes a rearwardly downwardly depending push bar which engages the post. Preferably, the push bar includes an angled foot. The plates may further include outwardly extending pins which limit the range of motion of the lunette ring.

Typically, the spaced skid members are bars connected on one end proximate the front Ackerman steering linkage and diverging rearwardly and downwardly to connect to a rear axle of the trailer. The tow bar is preferably connected to the drive post via a friction adapter which retains the tow bar in an upwardly angled position when decoupled from the hitch assembly.

One trailer and hitch system for a mobile robot according to this invention includes a trailer with a front steering linkage, a locking mechanism for releasably arresting the trailer, a tow bar extending from the steering linkage and terminating in a connector, and at least one obstacle traversing member. The mobile robot typically includes a hitch assembly receiver for the tow bar connector configured to couple the tow bar connector with the receiver when the tow bar connector is driven into the receiver, and a decoupling mechanism. A robot arm is maneuverable to engage the decoupling mechanism to release the tow bar connector from the receiver.

The preferred front steering linkage is an Ackerman style steering linkage. The preferred locking mechanism is configured to releasably position the Ackerman steering mechanism in a turned position.

The tow bar may extend upwardly from the Ackerman steering mechanism. In one design, the connector is a lunette ring. The obstacle traversing member may include at least one skid bar extending downwardly and rearwardly on a bottom of the trailer.

The preferred hitch assembly includes a frame with a slot for the lunette ring and a guide portion for guiding the lunette ring into the slot. The hitch assembly further includes a latch pivotable with respect to the frame and biased to close the slot. The decoupling mechanism may include a post extending from the latch.

One mobile robot trailer in accordance with this invention includes a front Ackerman steering linkage, a releasable locking mechanism for releasably positioning the Ackerman steering linkage in a turned position to arrest the trailer, a tow bar extending upwardly from the Ackerman steering linkage and terminating in a lunette ring, and spaced skid members extending downwardly and rearwardly.

One mobile robot in accordance with this invention includes a hitch assembly for a lunette ring. The hitch assembly typically includes a frame including a slot for the lunette ring and a guide portion for guiding the lunette ring into the slot, a latch pivotable with respect to the frame and biased to close the slot, and a decoupling mechanism configured to move the latch to release the lunette ring from the slot. A robot arm is maneuverable to engage the decoupling mechanism.

A mobile robot trailer in accordance with this invention may include a front steering linkage, a locking mechanism for releasably arresting the trailer, a tow bar extending from the steering linkage and terminating in a connector, and at least one obstacle traversing member.

A mobile robot in accordance with this invention may include a hitch assembly with a receiver for a tow bar connector configured to couple the tow bar connector with the receiver when the tow bar connector is driven into the receiver, and a decoupling mechanism.

In one embodiment, a trailer and hitch system for a mobile robot includes a trailer with a front steering linkage, and a tow bar extending from the steering linkage and terminating in a connector. A mobile robot hitch assembly comprises a receiver for the tow bar connector configured to couple the tow bar connector with the receiver when the tow bar connector is driven into the receiver, and a decoupling mechanism.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
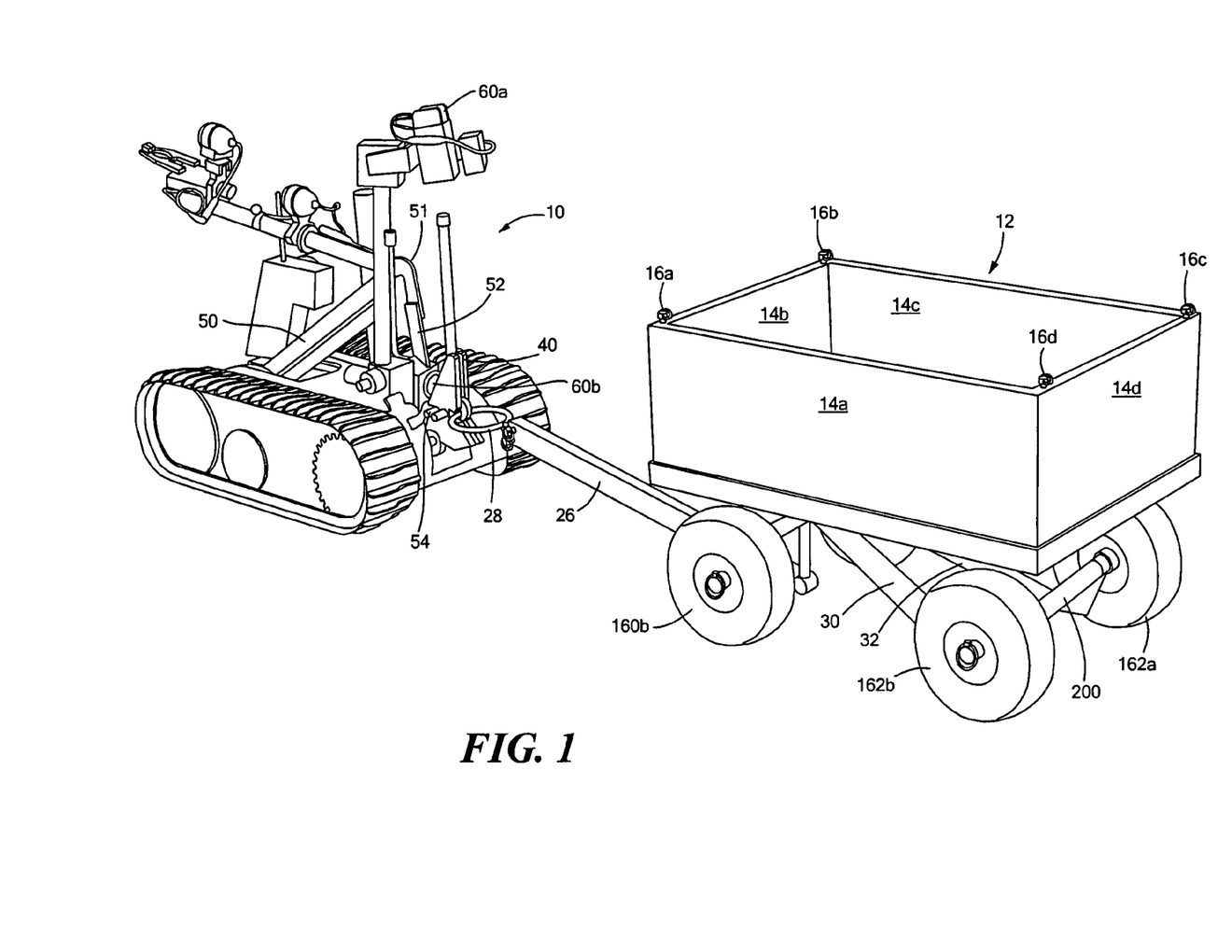
FIG. 1 is a schematic three-dimensional side view showing an example of a mobile remotely-controlled robot and trailer combination in accordance with the subject invention.

FIG. 1 shows an example of a robot 10 and a trailer 12 in accordance with this invention. Mobile remotely controlled robot 10 in this specific example is a TALON® robot available from Foster-Miller, Inc. (Waltham, Mass.). Robot 10 can tow trailer 12 to a location remote from the operator, release trailer 12, and then later recouple to trailer 12. Trailer 12 features a braking or arresting mechanism discussed below for when the trailer is decoupled from the robot on a sloping terrain and also to assist in coupling the trailer to and decoupling the trailer from the robot. Trailer 12 also features a construction that permits the trailer to better traverse obstacles. The typical trailer is 23" wide, 33" long, and bed 18 is 13" high. Trailers of other dimensions can be fabricated based on the mission or design criteria.

Figure 2:
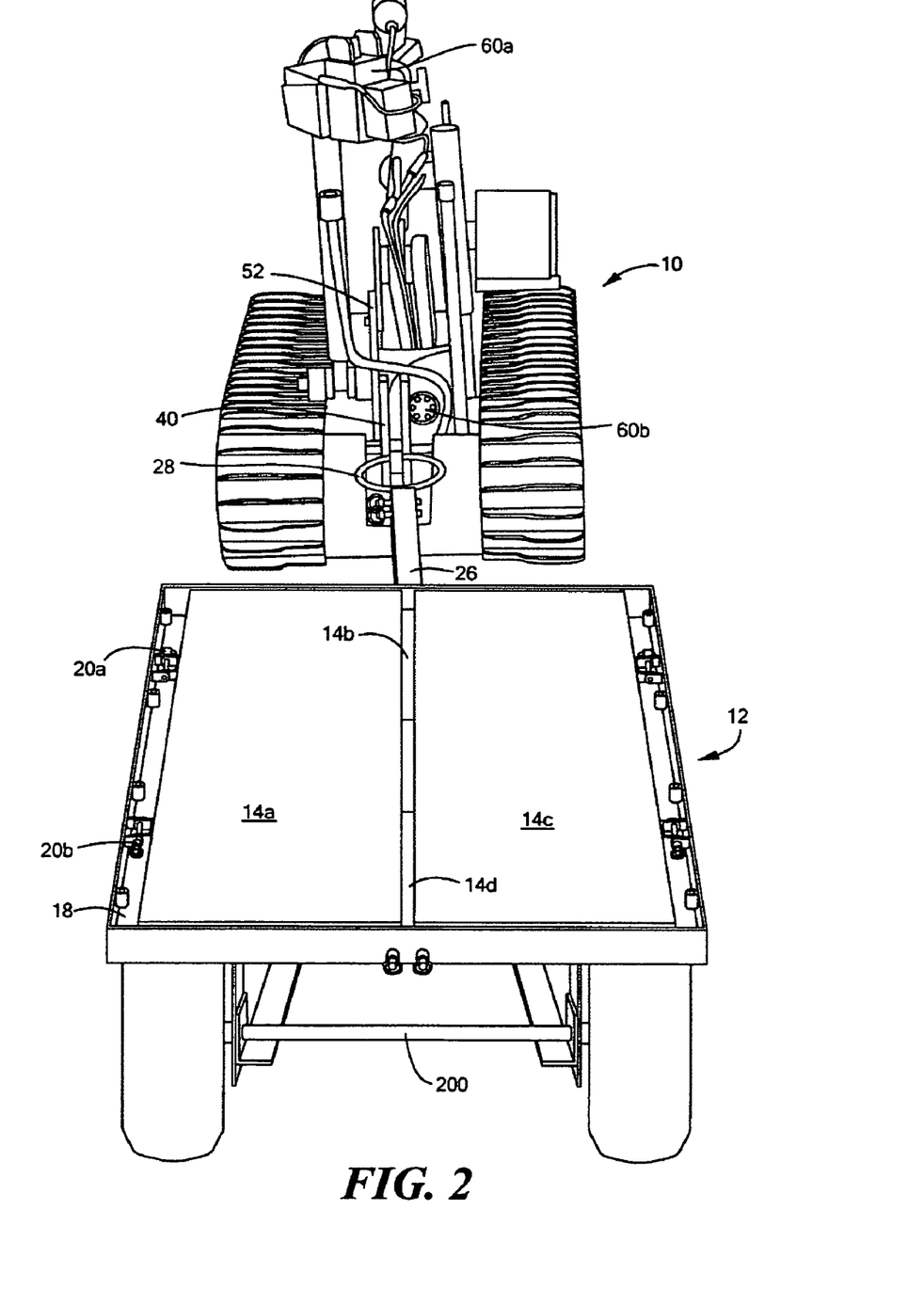
FIG. 2 is a schematic three-dimensional rear view showing the robot and trailer of FIG. 1.

In this particular non-limiting example, side walls 14a, 14b, 14c, and 14d of trailer 12 are both removable and foldable as shown in FIG. 2. Pins 16a-d, FIG. 1, for example, when removed, decouple the side walls from each other and allow side walls 14b and 14d to fold down onto bed 18 and side walls 14a and 14c to fold over side walls 14b and 14d as shown. Hinge pins 20a and 20b, for example, allow side wall 14a to be removed from the trailer bed.

Figure 3:
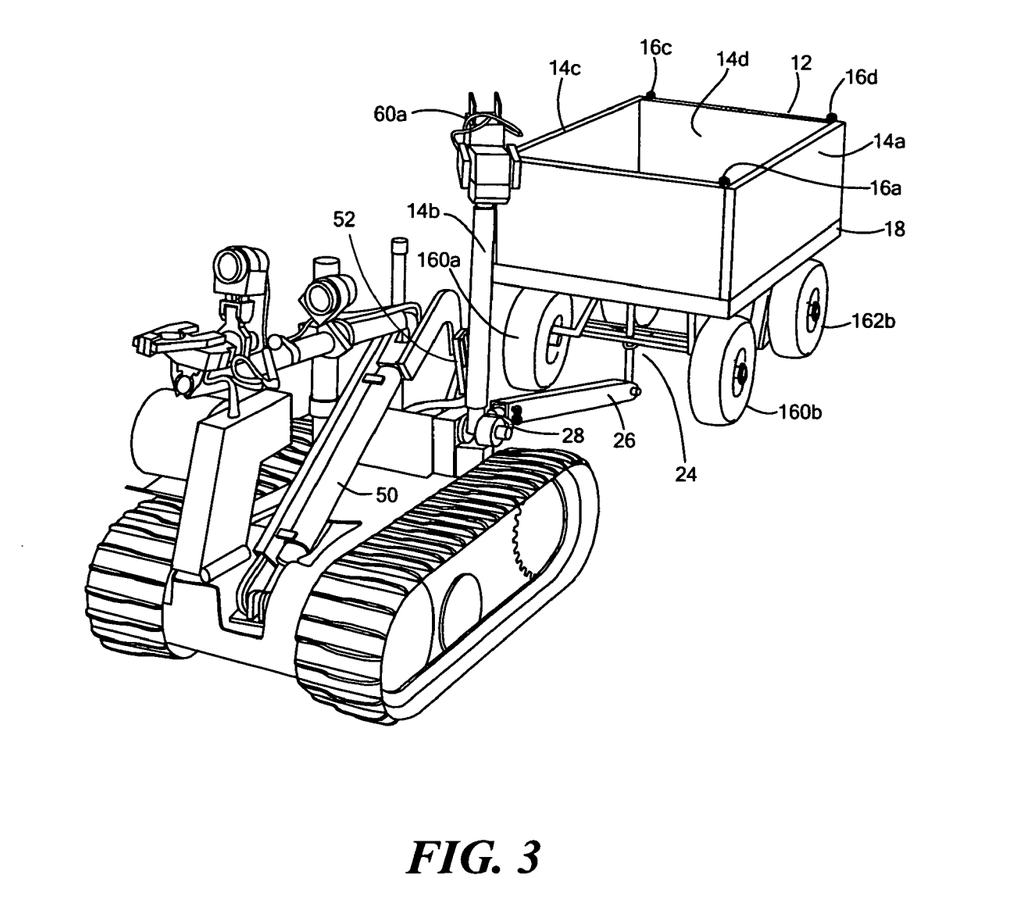
FIG. 3 is a schematic three-dimensional front view showing the robot and trailer of FIG. 1.

Preferably, trailer 12, FIG. 3 includes front "Ackerman" style steering linkage assembly 24. Tow bar 26, FIGS. 1-3 extends upwardly from steering linkage 24 and terminates in a connector such as lunette ring 28. Upwardly extending tow bar 26 in conjunction with obstacle traversing skid member bars 30 and 32, FIG. 1 allow trailer 12 when towed by robot 10 to traverse obstacles as discussed below.

Figure 4:
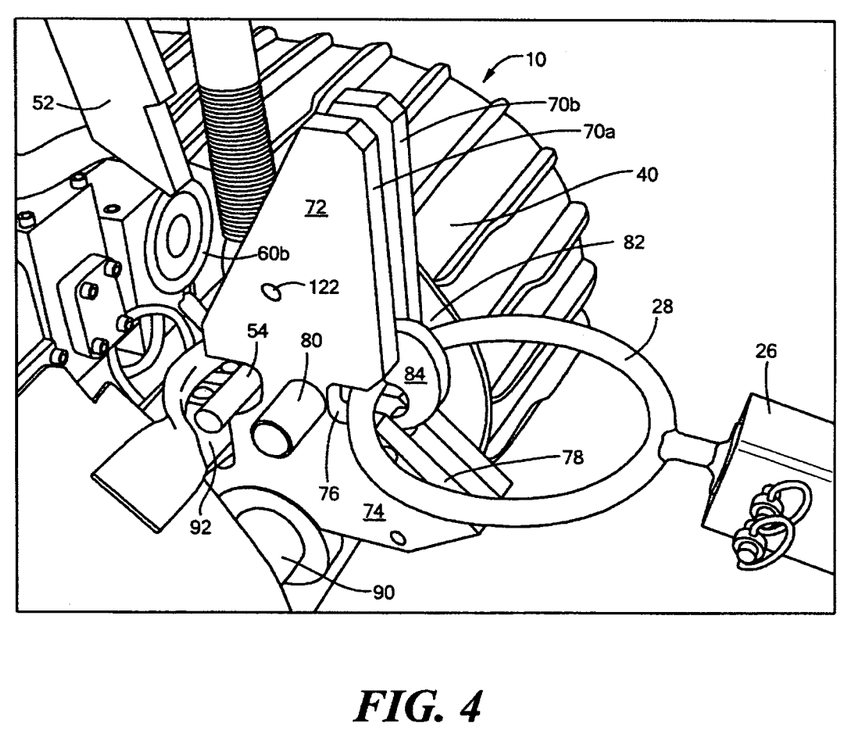
FIG. 4 is a schematic three-dimensional side view showing an embodiment of a hitch and connector assembly in accordance with the subject invention.

Hitch assembly 40, FIG. 4 receives lunette ring 28 therein when robot 10 is backed towards tow bar 26 and then lunette ring 28 is locked in hitch 40. To decouple trailer 12 from robot 10, robot arm 50, FIG. 3 is maneuvered by the operator to drive push bar 52 downward to engage decoupling mechanism post 54, FIG. 4 which releases lunette ring 28. Cameras 60a and 60b, FIG. 2 assist the operator in maneuvering robot 10 to hitch trailer 12 to robot 10 and in maneuvering arm 50 and push bar 52 attached thereto to push post 54 to decouple trailer 12 from robot 10.

Figure 5:
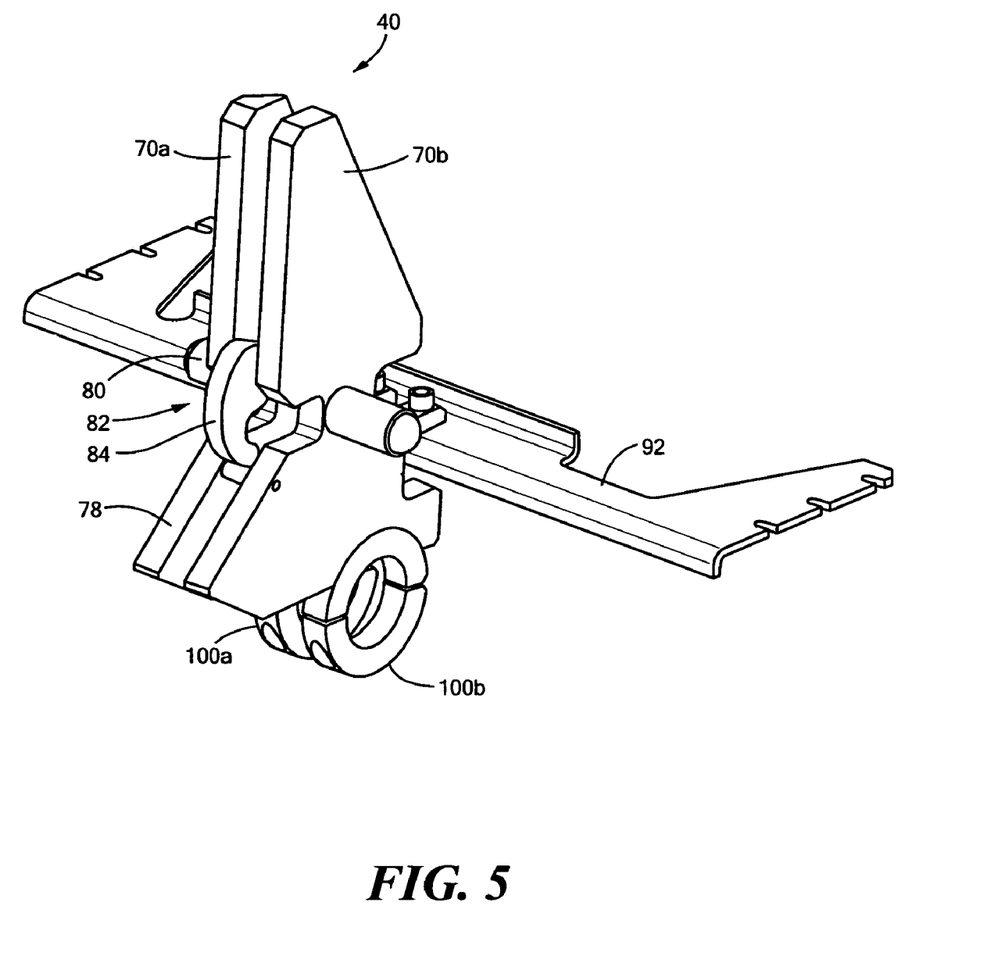
FIG. 5 is a schematic three-dimensional rear view showing the primary components associated with the hitch assembly shown in FIG. 4.

As shown more clearly in FIG. 4, hitch assembly 40 includes spaced frame plates 70a and 70b each, as shown for plate 70a, with upwardly extending ear 72 and downwardly depending angled ear guide portion 74. Slot 76 is located between ears 72 and 74 and receives lunette ring 28 therein. When robot 10 backs up, angled downwardly depending ear 74 defines guide surface 78 which assists in guiding lunette ring 28 into slot 76. Upwardly extending ear 72 prevents the lunette ring from inadvertently being engaged with structure on robot 10 as does blocking pin 80. A similar blocking pin is located on the other side of the hitch on the other frame plate 70b. Latch 82, pivotably positioned between frame plates 70a and 70b, includes exposed hook 84 biased into the position shown in FIG. 4 to close slot 76. Hitch assembly 40 is coupled to robot 10 via tube frame member 90 and bracket 92. As shown in FIG. 5, clamps 100a and 100b are attached to frame members 70a and 70b, respectively, and secured about robot frame member 90, FIG. 4. Frame members 70a and 70b are also attached to bracket 92, FIG. 5 which is secured to structure on the rear of the robot.

Figure 6:
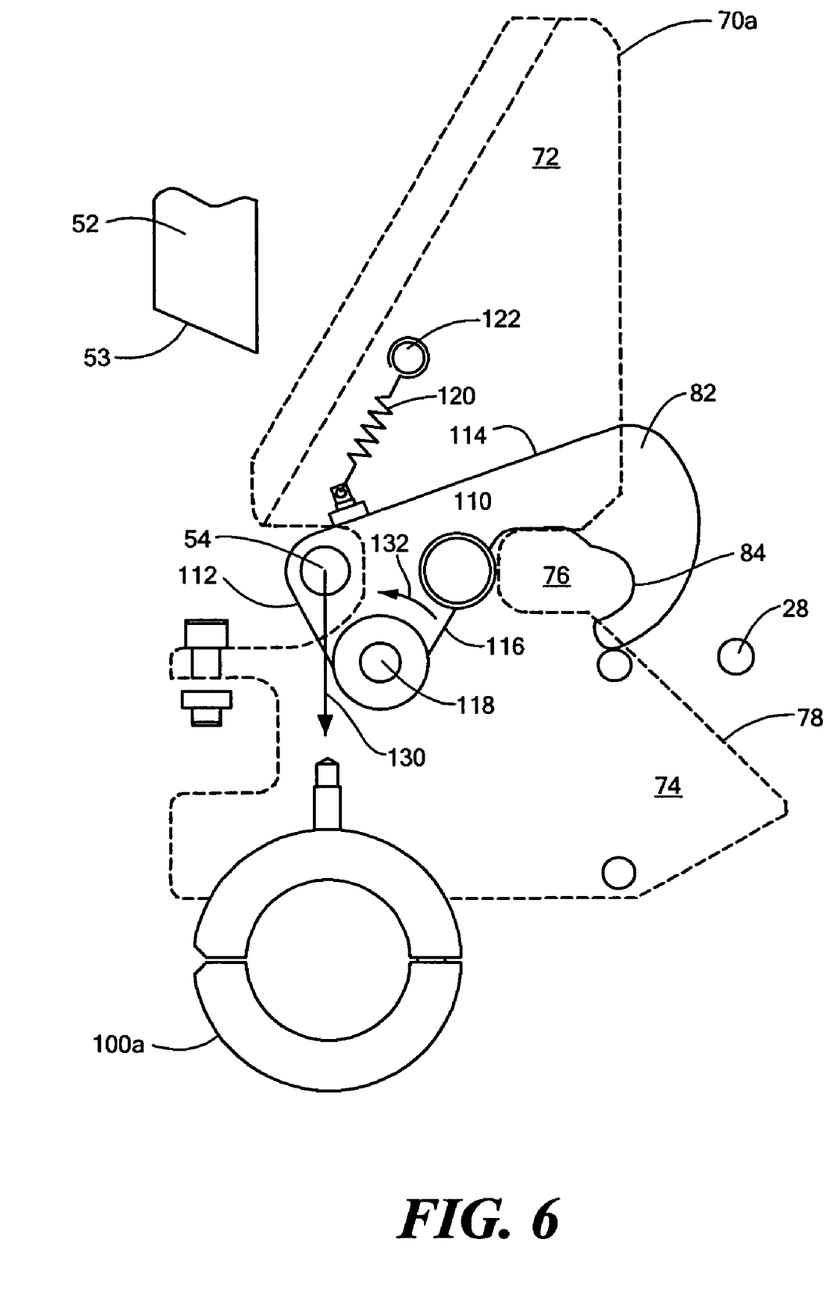
FIG. 6 is a schematic side view showing in more detail the latch assembly of the hitch depicted in FIG. 5.

As shown in FIG. 6, where plate 70a is now shown in phantom, latch 82 includes rocker portion 110 with distal edge 112, top edge 114, and bottom edge 116. Pin 118 extends through distal edge 112 proximate bottom edge 116 and pivotably connects rocker portion 110 to the frame plates. Post 54 extends from rocker portion 110 distal edge 112 proximate top edge 114. Tension spring 120 extends between rocker portion 110 and plate fastener 122. Lunette ring 28 can thus be driven to engage plates 70a and 70b guide portion 78 which lifts hook 84 as it pivots about pin 118 until lunette ring 28 is received in slot 76 whereupon hook 84 is urged downward to close slot 76 via gravity and via spring 120.

Then, when decoupling post 54 is pushed downward in the direction of arrow 130 by rearwardly and downwardly depending push bar 52 attached to the working robot arm, rocker portion 110 rotates in the direction of arrow 132 which raises hook 84 releasing the lunette ring from slot 76 as the mobile robot is driven forward. Preferably, push bar 52 includes angled foot 53 for this purpose. It is also preferred that, as shown in FIG. 1, push bar 52 is adjustable and attached to arm 50 by a "hockey stick" configured member 51.

In this way, no actuators are needed for the hitch. The trailer couples to the robot hitch by simply backing up the robot and the trailer decouples from the robot hitch by manipulating a robot arm which is already a component of the robot.

Figure 7:
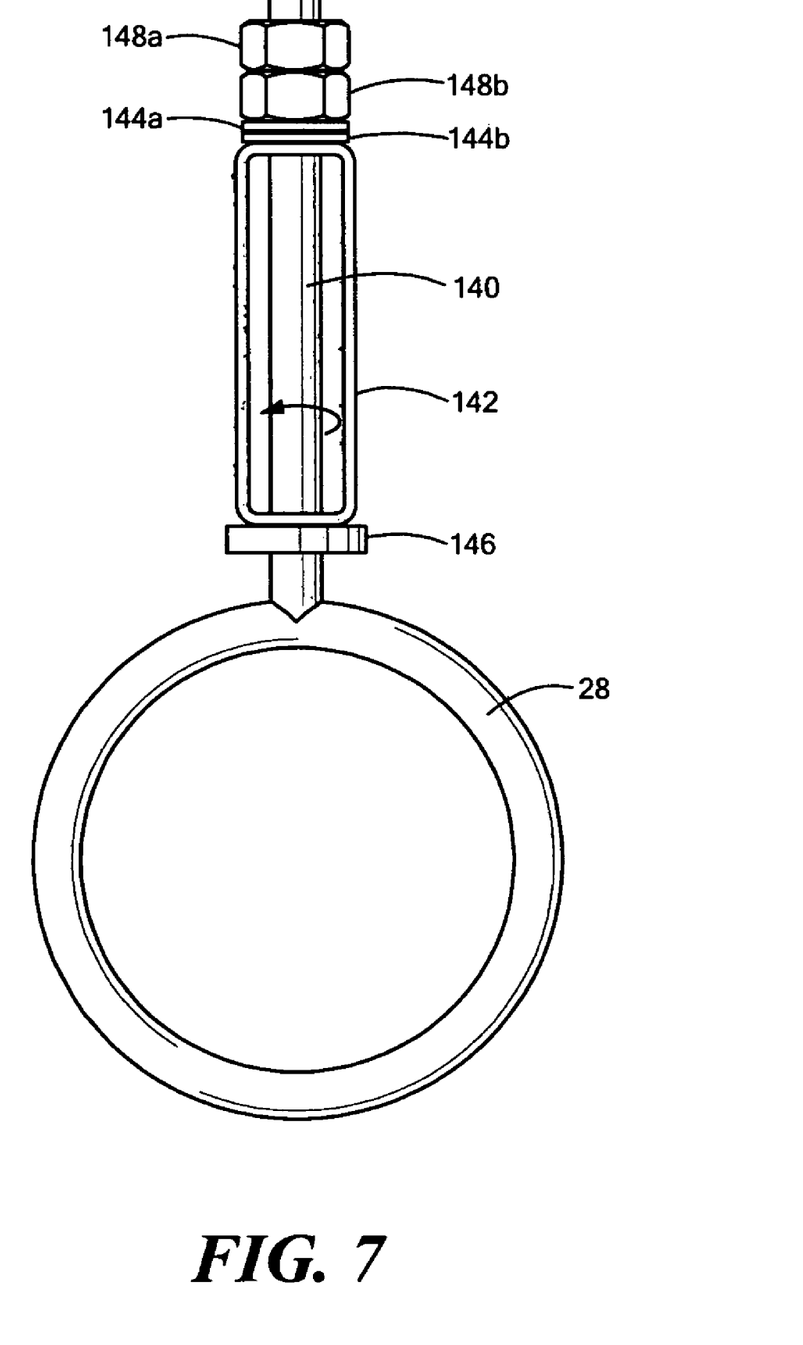
FIG. 7 is a schematic top view showing an example of a tow bar connector in accordance with the subject invention.
Figure 8:
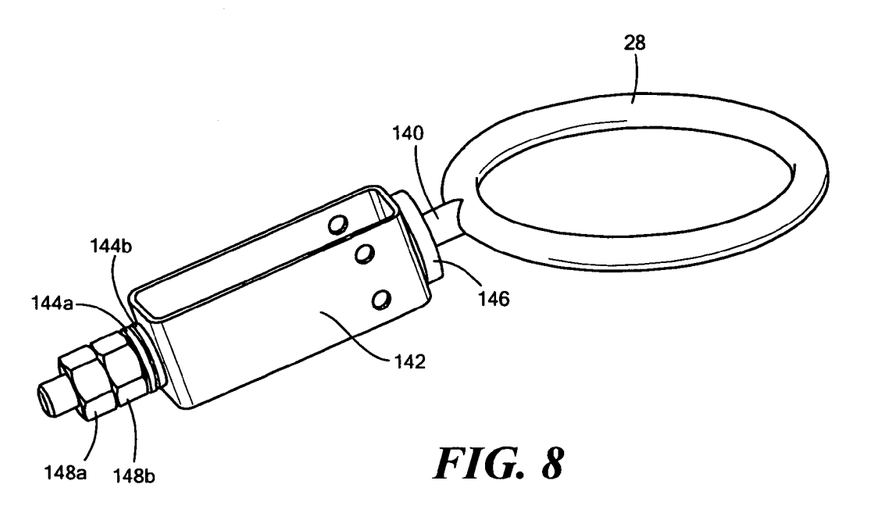
FIG. 8 is a schematic three-dimensional side view of the connector assembly shown in FIG. 7.
Figure 9:
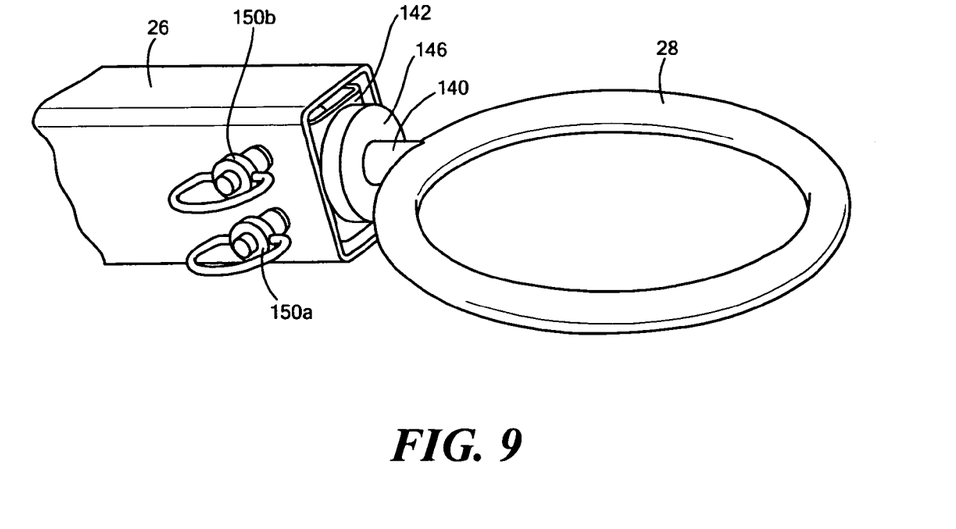
FIG. 9 is a schematic three-dimensional forward view showing the connector assembly shown in FIGS. 7-8 received in the end of the trailer tow bar.

One preferred version of lunette ring 28, FIGS. 7-9 includes shaft 140 extending through frame member 142 sized to slide within the open end of tubular tow bar 26, FIG. 9. Pins 150a and 150b secure frame member 142 within tubular tow bar 26. Shaft 140, FIGS. 7-8 and thus lunette ring 28 are free to rotate relative to frame member 142 by the inclusion of bellville washers 144a and 144b which, in combination with shoulder 146 and nuts 148a and 148b, allow shaft 140 to rotate when a torsion producing force is exerted on lunette ring 28 about the axis of shaft 140. Thus, should the trailer tip or turn over, lunette ring 28 will rotate and the mobile robot will not be tipped or turned over by the trailer. It is preferred that ring 28 have a large diameter, e.g., between 3 and 8 inches, for ease of remotely engaging with the hitch on the robot.

Figure 11:
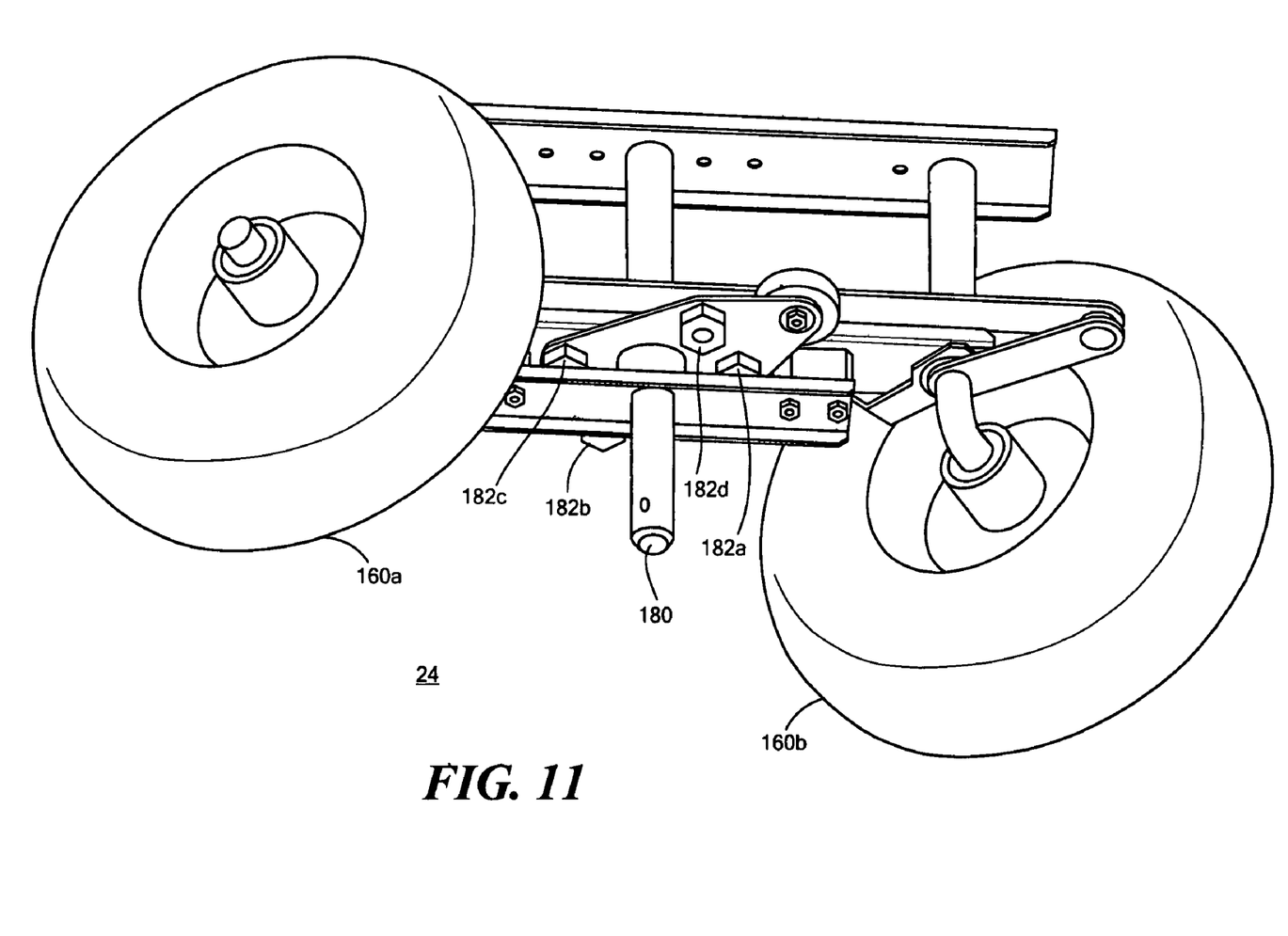
FIG. 11 is a schematic three-dimensional front-upward view showing how the trailer steering mechanism can be releasably locked in an extreme turn position in accordance with the subject invention.

To arrest trailer 12, FIG. 1, when decoupled from robot 10 and also during the coupling and decoupling actions, it is preferred that Ackerman steering linkage 24 be releasably positionable in an extreme turned position so front wheels 160a and 160b are turned to their maximum extent as shown in FIG. 11. Since the rear wheels of the trailer (162a and 162b, FIG. 1) remain straight, travel of the trailer is thus constrained even if it is left on a slope or when the robot is backed up to engage the trailer or when the robot is decoupled from the trailer.

Figure 10:
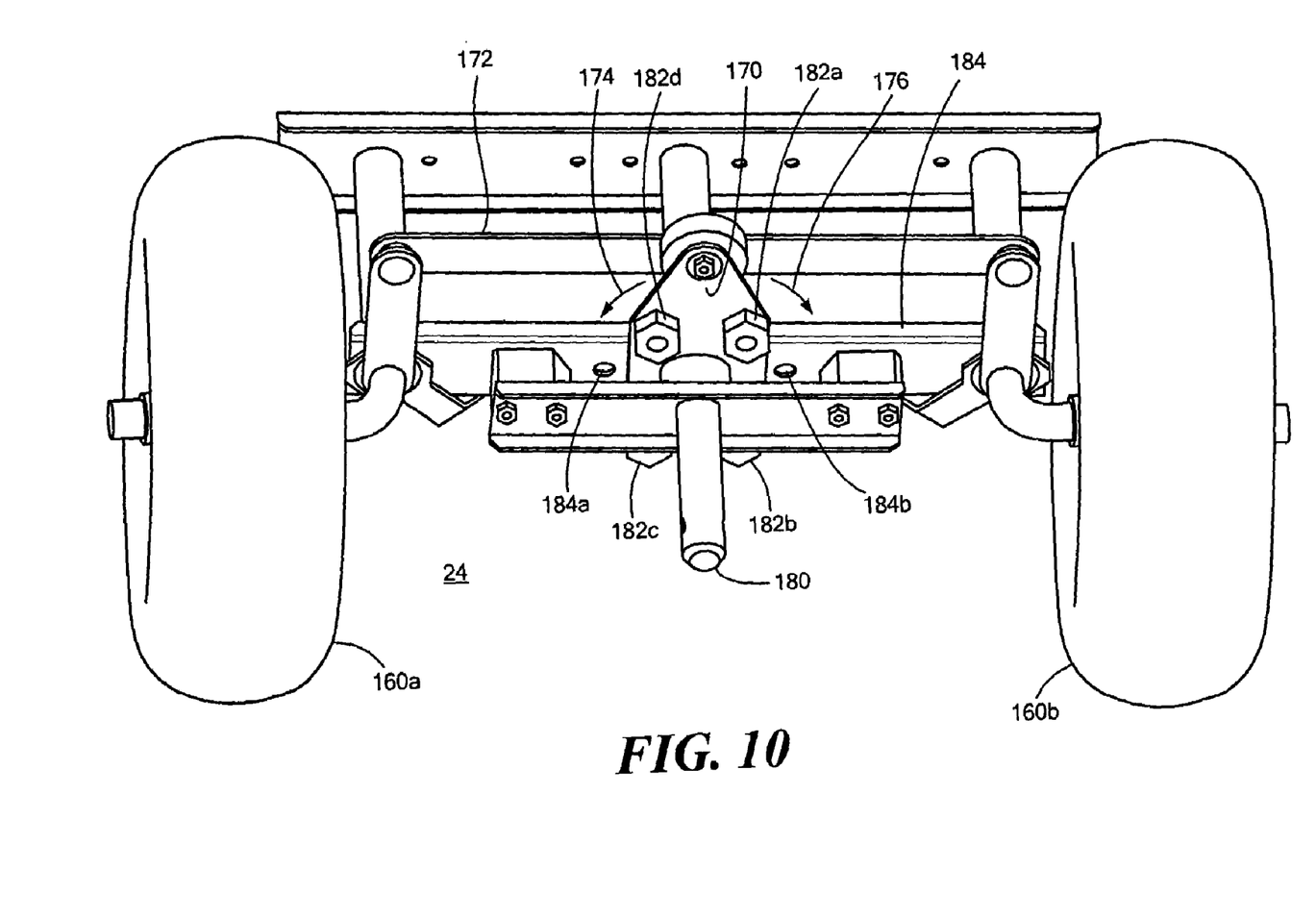
FIG. 10 is a schematic three-dimensional front-upward view showing an example of a trailer steering mechanism in accordance with the subject invention.

One exemplary locking mechanism for effecting this front wheel turn includes drive plate 170, FIGS. 10-11 attached to drive post 180 and pivotally connected to Ackerman link 172 to rotate with drive post 180 in the direction of arrows 174 and 176 as driven by the tow bar attached to drive post 180 downwardly depending from drive plate 170. Spring ball mechanisms 182a-d each include a spring loaded ball which releasably engage detents 184a and 184b in trailer frame member 184.

Figure 12:
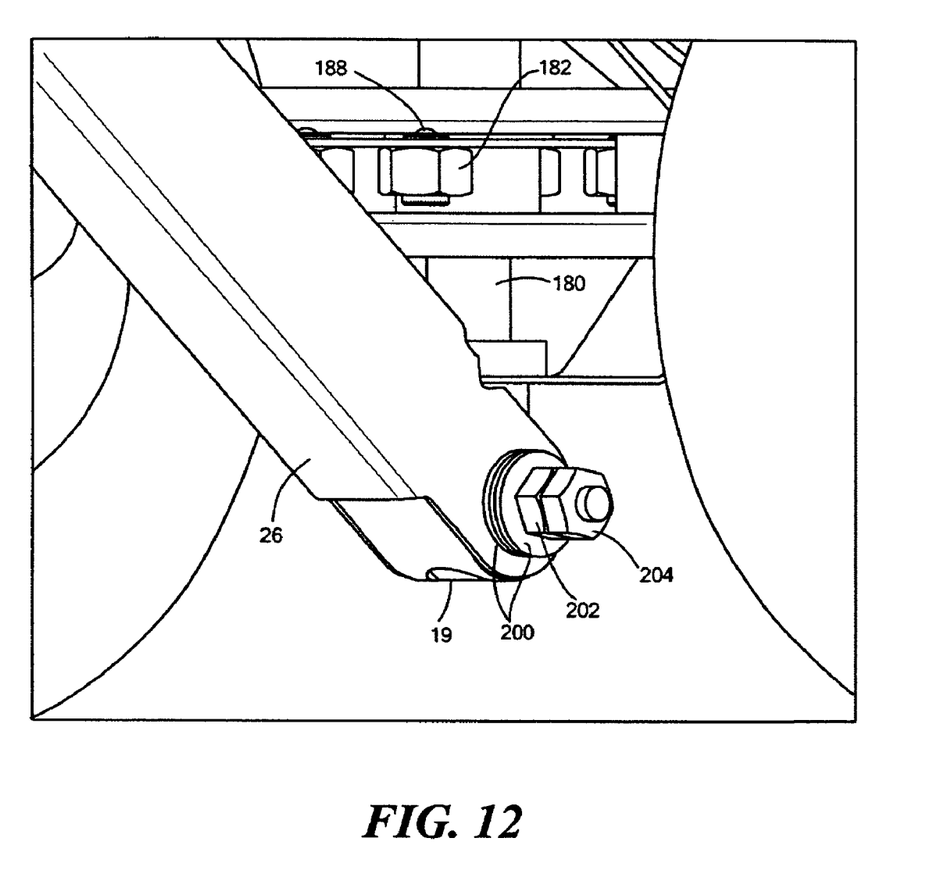
FIG. 12 is a schematic three-dimensional view showing a portion of a spring loaded ball which forms a component of the trailer arresting mechanism shown in FIGS. 10-11.

As shown in FIG. 11, the spring ball in ball mechanism 182a, FIG. 12 is engaged in detent 184b (FIG. 10) and the spring ball in ball mechanism 182c is engaged in detent 184a (FIG. 10) to releasably lock tires 160b and 160a in the position shown to arrest the trailer. Thus, before disengaging the trailer from the robot, the operator may back the robot up at an angle to drive wheels 160a and 160b to the position shown in FIG. 11 whereupon the Ackerman steering linkage is releasably locked in the position shown to arrest the trailer for disengagement, stability on a slope, and later re-engagement FIG. 12 shows spring ball 188 of spring ball mechanism 182. FIG. 12 also shows tow bar 26 attached to drive post 180 via adapter 19.

Adapter 19 allows tow bar 26 to pivot but retains tow bar 26 in an upwardly angled position when tow bar 26 is decoupled from the robot so it can later be recoupled to the robot. If tow bar 26 fell to the ground, it could not be easily recoupled to the robot. The connection between the tow bar 26 and drive post 180 is typically a high-friction pivot mechanism. Compressed Belleville washers 200 and nut 202 and locknut 204 are for adjustment and setting of the friction. This friction holds up the weight of the tow bar 26 so the lunette ring 28, FIG. 4 remains suspended at or near the height of the hitch latch 84 (within the range of the guide portions 74) when the trailer is decoupled. The friction is set high enough to accomplish this objective, but not too high to prevent the tow bar 26 from pivoting as the robot/trailer traverse over undulating terrain. The bolted pivot also permits the tuning-steering action of the robot to be transmitted via the tow bar 26 to the drive post 180, thus operating the Ackerman steering linkage on the trailer.

Figure 13:
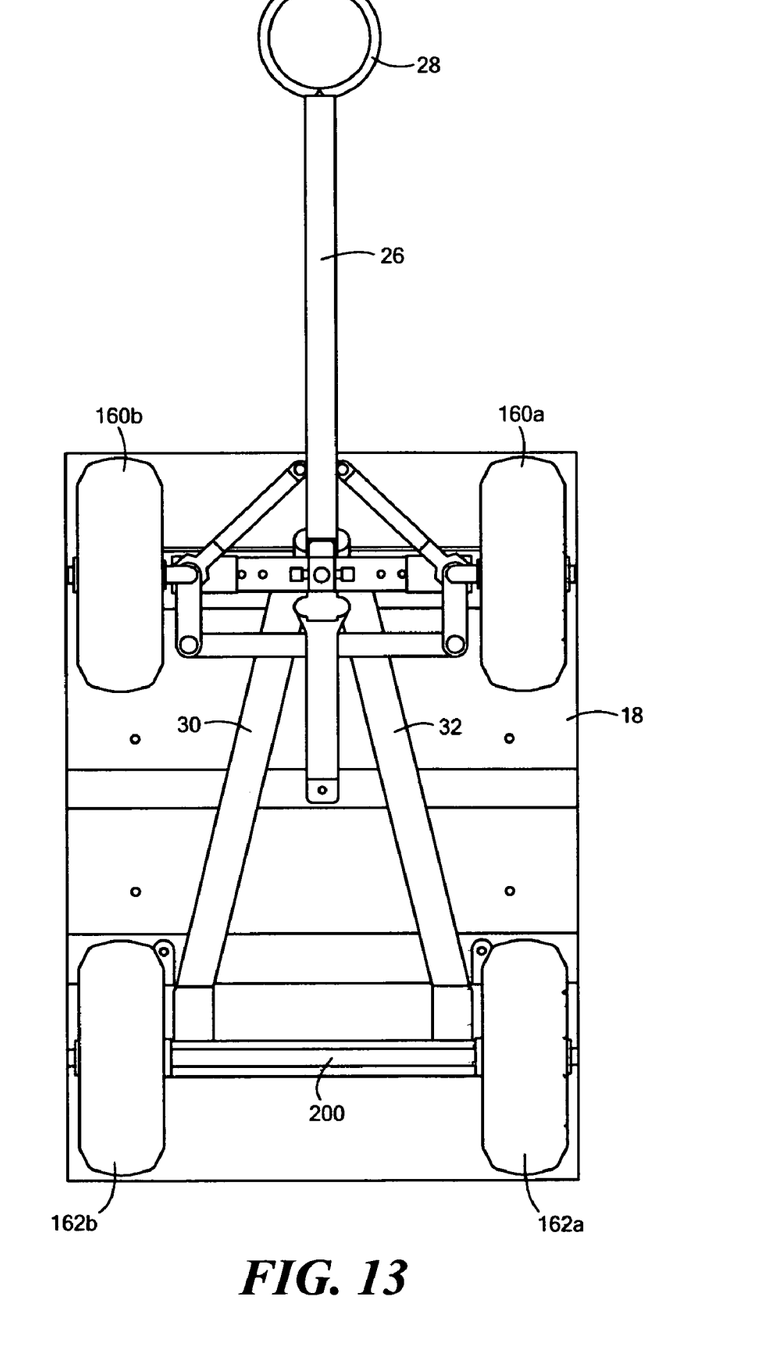
FIG. 13 is a schematic three-dimensional view of the underside of a trailer in accordance with the subject invention.
Figure 14A:
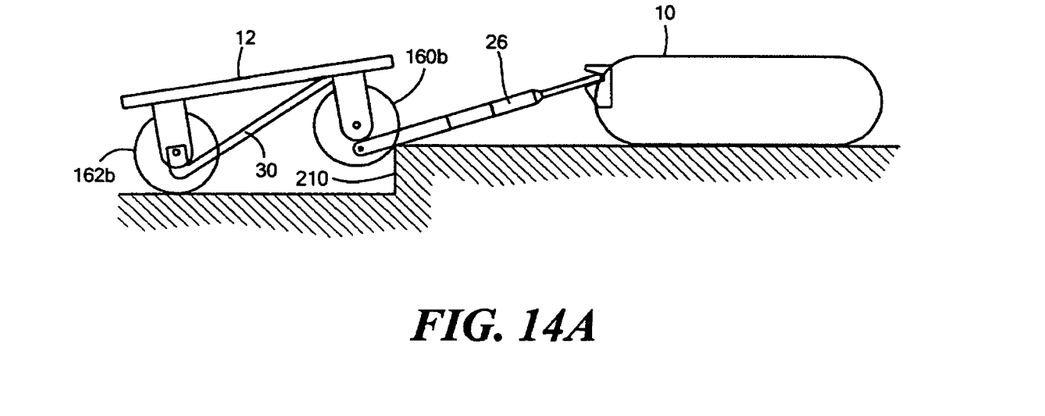
FIGS. 14A-14B are highly schematic side views showing how the preferred embodiment of the trailer in accordance with the subject invention is able to traverse obstacles.
Figure 14B:
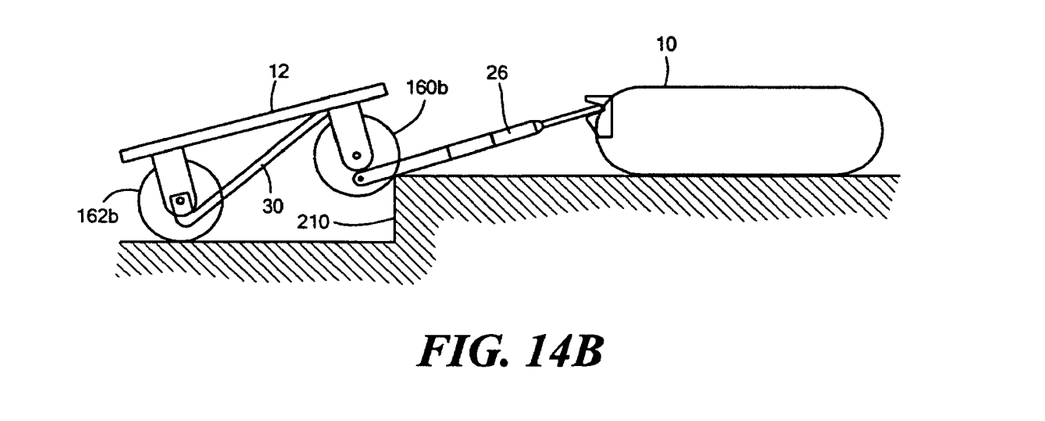

As discussed above, upwardly extending tow bar 26, FIG. 1 in conjunction with spaced skid members 30 and 32 which extend downwardly and rearwardly, assist with traversing obstacles. As shown in FIG. 13, spaced skid members 30 and 32 are typically bars connected to bed 18 proximate and behind the front Ackerman steering linkage and then diverging downwardly to connect to the rear axle 200 of the trailer. As shown in FIGS. 14A and 14B, upwardly angled (e.g., at an angle of between 10-30° with respect to horizontal) tow bar 26 assists in raising the front trailer wheels up to maneuver over ledge 210. Similarly, downwardly and rearwardly extending skid member 30 (e.g., also at 10-30° with respect to horizontal) assists in raising the rear trailer wheels to traverse ledge 210. It is also preferred that tow bar 26 be positioned below the center line of the front wheels via post 180, FIG. 10.

Although specific features of the invention are shown in some drawings and not in others, this is for convenience only as each feature may be combined with any or all of the other features in accordance with the invention. For example, steering linkages other than an Ackerman style steering linkage are within the scope of this subject invention. Also, the design of a locking mechanism for the trailer can vary as well. So too can the obstacle traversing subsystem. Trailer connectors other than a lunette ring may be used in conjunction with a tow bar. The hitch assembly receiver for the connector may also vary in design as well depending on the specific implementation. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A trailer and hitch system for a mobile robot, the system comprising:
   a trailer including:
      a front Ackerman steering linkage,
      a releasable locking mechanism for releasably positioning the Ackerman steering linkage in a turned position to arrest the trailer,
      a tow bar extending upwardly from the Ackerman steering linkage and terminating in a lunette ring, and
      spaced skid members extending downwardly and rearwardly; and
   a mobile robot including:
      a hitch assembly for the lunette ring, the hitch assembly comprising:
         a frame including a slot for the lunette ring and a guide portion for guiding the lunette ring into the slot,
         a latch pivotable with respect to the frame and biased to close the slot, and
         a decoupling mechanism configured to move the latch to release the lunette ring from the slot, and
      an arm maneuverable to engage the decoupling mechanism.

2. The system of claim 1 in which the trailer includes removable side walls.

3. The system of claim 1 in which the trailer includes folding side walls.

4. The system of claim 1 in which the trailer includes removable and foldable side walls.

5. The system of claim 1 in which the Ackerman steering linkage includes a downwardly depending drive post and the tow bar is connected to said drive post.

6. The system of claim 5 in which the locking mechanism includes a drive plate with spaced spring ball mechanisms thereon receivable in detents in a frame member of the trailer.

7. The system of claim 1 in which the tow bar includes a tubular member and the lunette ring is receivable in the end of the tubular member.

8. The system of claim 7 in which the lunette ring is attached to a shaft extending through a frame member received in the end of the tubular member.

9. The system of claim 8 in which the shaft is rotatably affixed to the frame member.

10. The system of claim 1 in which the lunette ring has a diameter of between 3 and 8 inches for easier coupling to the hitch assembly.

11. The system of claim 1 in which the hitch assembly frame includes spaced plates and the latch is positioned between the spaced plates.

12. The system of claim 11 in which each plate includes an upwardly extending ear and an angled downwardly depending ear guide portion, the slot located between the upwardly extending ear and the angled downwardly depending ear.

13. The system of claim 11 in which the latch includes an exposed hook and a rocker portion between the plates.

14. The system of claim 13 in which the rocker portion includes a distal edge, a top edge, and a bottom edge, a pin through the distal edge proximate the bottom edge pivotably connecting the rocker portion to the plates.

15. The system of claim 14 in which the decoupling mechanism includes a post extending from the rocker portion distal edge proximate the top edge.

16. The system of claim 14 further including a tension spring extending from the rocker portion top edge.

17. The system of claim 15 in which the mobile robot arm includes a rearwardly downwardly depending push bar which engages the post.

18. The system of claim 17 in which the push bar includes an angled foot.

19. The system of claim 11 in which the plates further include outwardly extending pins which block the lunette ring.

20. The system of claim 1 in which the spaced skid members are bars connected on one end proximate the front Ackerman steering linkage and diverging rearwardly and downwardly to connect to a rear axle of the trailer.

21. The system of claim 5 in which the tow bar is connected to the drive post via a friction adapter which retains the tow bar in an upwardly angled position when decoupled from the hitch assembly.

* * * * *